United States Patent
Boivin (10) Patent No.: US 9,979,610 B2
(45) Date of Patent: May 22, 2018

(54) METHOD OF SMOOTHING THE WORKLOAD OF A SERVER

(75) Inventor: Mathieu Boivin, Aulnay-Sous-Bois (FR)

(73) Assignee: VIACCESS, Paris la Defense (FR)

( * ) Notice: Subject to any disclaimer, the term of this patent is extended or adjusted under 35 U.S.C. 154(b) by 490 days.

(21) Appl. No.: 14/236,413

(22) PCT Filed: Jul. 18, 2012

(86) PCT No.: PCT/EP2012/064099
§ 371 (c)(1),
(2), (4) Date: Jan. 31, 2014

(87) PCT Pub. No.: WO2013/017411
PCT Pub. Date: Feb. 7, 2013

(65) Prior Publication Data
US 2014/0173084 A1    Jun. 19, 2014

(30) Foreign Application Priority Data

Aug. 2, 2011 (FR) ...................................... 11 57101

(51) Int. Cl.
*G06F 15/173* (2006.01)
*H04L 12/24* (2006.01)
(Continued)

(52) U.S. Cl.
CPC ................ *H04L 41/50* (2013.01); *G06F 8/65* (2013.01); *H04L 67/1097* (2013.01);
(Continued)

(58) Field of Classification Search
CPC .................................. G06F 8/65; H04L 41/50
(Continued)

(56) References Cited

U.S. PATENT DOCUMENTS 7,050,424 B2 * 5/2006 Cheng ............... H04L 29/06027
370/352
7,321,926 B1 * 1/2008 Zhang ................... G06F 9/5033
455/453

(Continued)

FOREIGN PATENT DOCUMENTS

EP    1566736    8/2005
JP    9251436    9/1997
(Continued)

*Primary Examiner* — Kevin Bates
*Assistant Examiner* — Clarence McCray
(74) *Attorney, Agent, or Firm* — Occhiuti & Rohlicek LLP (57) ABSTRACT

Smoothing a workload of a server responding to requests transmitted by terminals includes computing a scheduled date on which the terminal must connect with the server to transmit the request to it, activating the connection based on the date so that the second connection happens on or after it, building a workload schedule for the server according to dates, for each terminal, recording switching between active and inactive states thereof, building, for each terminal, based on the recorded switching, a profile associating, with each coming date, a probability that the terminal is active on that date, and wherein computing the date comprises selecting, based on the workload schedule and the profile, a scheduled date associated, in the workload schedule, with a forecast workload below a first threshold, and, in the profile of use of the terminal, with a probability, above a second threshold, that the terminal is active.

13 Claims, 3 Drawing Sheets

(51) Int. Cl.

| | | |
|---|---|---|
| *G06F 9/445* | (2018.01) | |
| *H04L 29/08* | (2006.01) | |
| *H04N 21/239* | (2011.01) | |
| *H04N 21/24* | (2011.01) | |
| *H04N 21/25* | (2011.01) | |
| *H04N 21/258* | (2011.01) | |
| *H04N 21/262* | (2011.01) | |
| *H04N 21/4405* | (2011.01) | |
| *H04N 21/442* | (2011.01) | |
| *H04N 21/466* | (2011.01) | |
| *H04N 21/6547* | (2011.01) | |
| *H04N 21/658* | (2011.01) | |
| *H04N 21/8355* | (2011.01) | |

(52) U.S. Cl.
CPC ..... *H04N 21/2393* (2013.01); *H04N 21/2405* (2013.01); *H04N 21/252* (2013.01); *H04N 21/25816* (2013.01); *H04N 21/262* (2013.01); *H04N 21/4405* (2013.01); *H04N 21/4424* (2013.01); *H04N 21/4667* (2013.01); *H04N 21/6547* (2013.01); *H04N 21/6582* (2013.01); *H04N 21/8355* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 7,730,300 | B2 * | 6/2010 | Candelore | G06Q 20/3674 380/229 |
| 7,995,577 | B2 * | 8/2011 | Boutteloup | H04L 63/0428 370/312 |
| 7,995,603 | B2 * | 8/2011 | Revital | G06F 21/10 370/345 |
| 8,086,732 | B1 * | 12/2011 | Volz | H04L 69/40 709/200 |
| 8,387,054 | B1 * | 2/2013 | Zeis | G06F 9/4881 709/226 |
| 8,488,788 | B2 * | 7/2013 | Candelore | G06F 21/6218 380/210 |
| 9,128,766 | B1 * | 9/2015 | Herington | G06F 1/3203 |
| 2001/0042112 | A1 | 11/2001 | Slivka et al. | |
| 2002/0016956 | A1 | 2/2002 | Fawcett | |
| 2003/0088672 | A1 * | 5/2003 | Togasaki | H04L 29/06 709/226 |
| 2005/0066014 | A1 * | 3/2005 | Willehadson | G06F 9/505 709/220 |
| 2005/0273805 | A1 * | 12/2005 | Roever | G06Q 30/06 725/25 |
| 2007/0192763 | A1 * | 8/2007 | Helvick | 717/168 |
| 2008/0154805 | A1 * | 6/2008 | Gurumoorthy | G06F 8/65 706/12 |
| 2010/0036949 | A1 * | 2/2010 | Li | H04L 67/28 709/225 |
| 2010/0195827 | A1 * | 8/2010 | Lee | H04N 7/1675 380/200 |
| 2010/0205045 | A1 * | 8/2010 | Zhang | G06Q 30/02 705/14.1 |
| 2010/0333105 | A1 * | 12/2010 | Horvitz | G06F 9/4893 718/105 |
| 2012/0290725 | A1 * | 11/2012 | Podila | G06F 9/5011 709/226 |
| 2012/0290831 | A1 * | 11/2012 | Magis | H04L 9/083 713/150 |
| 2013/0046969 | A1 * | 2/2013 | Dubroeucq | H04N 21/631 713/150 |
| 2013/0172079 | A1 * | 7/2013 | Ivanov | H04L 69/40 463/31 |

FOREIGN PATENT DOCUMENTS

| | | |
|---|---|---|
| JP | 20075971 | 1/2007 |
| JP | 2008197811 | 8/2008 |

* cited by examiner

METHOD OF SMOOTHING THE WORKLOAD OF A SERVER

RELATED APPLICATIONS

Under 35 USC 371, this is the national stage entry of PCT/EP2012/064099, filed on Jul. 18, 2012, which claims the benefit of the Aug. 2, 2011 priority date of French Application 1157101. The contents of the foregoing are incorporated herein by reference.

FIELD OF INVENTION

The invention pertains to a method for smoothing the workload of a transaction server executing processing operations in response to requests transmitted by terminals that are remote and distinct from one another. The invention also pertains to a method of operation of a terminal and a server for implementing this smoothing method. Finally, the invention also pertains to a terminal, a server and an information-recording medium to implement this smoothing method.

BACKGROUND

The term "workload" designates a measurable physical quantity that enables the computing of the occupancy rate of an information technology resource exploited by the transaction server to execute the processing required by the terminal. Each information technology resource possesses a load threshold beyond which it can no longer be used to perform additional processing. When this load threshold is crossed, then the resource or system that incorporates this resource is said to be "overloaded." The occupancy rate is typically the ratio between the number of already ongoing processing operations and this load threshold. For example, typically, the measurable physical quantity is the number of simultaneous connections currently set up with the server. This measurable physical quantity can also be the number of operations executed per second by an electronic microprocessor of the server to process the requests from the terminals.

Smoothing the workload of the transaction server consists, first of all, in preventing its load threshold from being crossed at points in time. Typically, when the load threshold is reached, either the connection server rejects any new connection or the server sets up the new connection but does not execute the processing operation requested by the terminal because the necessary resource or resources are overloaded. In both these cases, there is deemed to be a "failure" of the connection since it has not led to the immediate execution of the processing requested by the terminal.

Preferably, the smoothing of the workload also consists in distributing the processing operations executed by the transaction server as uniformly as possible in time, and, if possible, in maintaining the workload constantly above a predetermined threshold.

To smooth the workload of the transaction server, prior-art methods include: computing a scheduled date on which the terminal must set up a connection with the transaction server to transmit a request to it, activating the setting up of this connection by this terminal according to the computed scheduled date so that the setting up of this connection takes place only when or after this scheduled date has arrived, and building a workload schedule for the transaction server according to the scheduled dates computed, this workload schedule associating, with each possible date, a forecast workload of this transaction server at this date.

The term "date" designates any piece of information used to indicate a determined instant relatively to a point of origin of the times. A date can take different formats. For example, one of the classic formats is the year/month/date/hour/minute/second format. The date can also be written in the form of a digital value or a number of successive predetermined time intervals that have elapsed since the point of origin of the times. The point of origin of the times is generally absolute and common to all the terminals and servers. However, the point of origin of the times can also be fixed relative to a particular event, such as the reception of a summons message. For example, here below in this description, the date is an instant measured by the number of seconds that have elapsed since a point of origin of the times common to all the apparatuses. The clocks used by the different apparatuses to measure the date are synchronized with one another in a conventional manner.

Here below, the term "current date" denotes the date corresponding to the present instant.

Among the known methods is that envisaged in the patent application JP 2007 005971 to fix the scheduled date according to the workload schedule of the transaction server to limit connection failures on the scheduled date. As a result of this, the workload of the transaction server is smoothed efficiently since, in principle, the terminal is connected to the transaction server only on a date when this server has the capacity to execute the requested processing operation. This limits overloads on the transaction server. However, it is desirable to improve this method to smooth the workload of the transaction server even more efficiently.

The prior art is also known from: EP 1566736, and U.S. Patent Publ. 2008/154805.

SUMMARY

An object of the invention therefore is a method for smoothing the workload wherein the method comprises: for each terminal, recording the instants of switching between: an active state of the terminal in which this terminal is capable of setting up the connection with the transaction server, and an inactive state of the terminal in which this terminal is incapable of setting up this connection with the transaction server; building for each terminal, on the basis of the recorded switching instants, an individual profile of use associating, with each possible coming date, a probability of state corresponding to the probability that the terminal is in the active state at this date; and computing the scheduled date consists in selecting, as a function of the workload schedule and of the individual profile, a scheduled date associated, in the workload schedule of the transaction server, with a forecast workload below a first predetermined threshold, and at the same time associated, in the individual profile of use of this terminal, with a probability of state corresponding to a probability, above a second predetermined threshold, that the terminal is in the active state.

The above method maximizes the chances of success of the processing of the request of the terminal during its connection on the computed scheduled date. Indeed, the scheduled date is computed so that it occurs both: at an instant when the workload of the transaction server is sufficiently low for this server to immediately execute the processing requested by the terminal; and at an instant when the terminal is in the active state and can therefore get connected with the transaction server.

This method therefore restricts the number of connection failures and therefore smoothens the workload of the server even more efficiently.

Furthermore, this method can be entirely automated so that intervention by a user becomes unnecessary.

The embodiments of this method may comprise one or more of the following characteristics:

the method comprises:

the building of a common profile of use from the switching instants recorded for all the terminals, this common profile associating, with each possible coming date, a common probability of state corresponding to the probability that any unspecified terminal among the different terminals is in the active state, if the individual profile of a terminal associates, with each coming date, an individual probability of state, corresponding to a probability, above the second predetermined threshold, that this terminal is in the active state whatever the coming date, then the computing of the scheduled date consists in selecting a scheduled date which, in addition, is associated, in the common profile of use, with a common probability of state corresponding to a probability, below a second predetermined threshold, that any unspecified terminal among the different terminals is in the active state;

the computing of the scheduled date consists, in addition, in automatically selecting the scheduled date closest to the current date;

before the computing of the scheduled date, the terminal activates the setting up of a first connection with a scheduled-date server to obtain the scheduled date computed from its individual profile of use and then interrupts this first connection before the computed scheduled date, the connection whose activation is activated according to the computed scheduled date then forming the second connection;

at the first connection:

the terminal transmits, to the scheduled-date server, an electronic certificate containing an identifier of this terminal and a digital signature of this terminal identifier with a private key known to this terminal alone, then the scheduled-date server verifies the authenticity of the identifier of the terminal from the electronic certificate received, then if the terminal is correctly authenticated, a scheduled date is computed and then transmitted to this terminal, and if the terminal is not correctly authenticated, no scheduled date is computed for this terminal;

at this first connection, only if the terminal is correctly authenticated, the method comprises:

the generating of a temporary electronic certificate comprising at least the computed scheduled date, an identifier of the terminal to which this scheduled date has been allotted and a digital signature of this computed date and of this identifier of the terminal with a private key proper to the transaction server, then the transmitting of this temporary electronic certificate to the terminal, at the second connection the method comprises:

the transmitting, by the terminal, of the temporary electronic certificate received at the scheduled-date server or the transaction server, the verifying of the authenticity of the temporary electronic certificate and of the correspondence between the identifier of the terminal contained in this temporary electronic certificate and an identifier of the terminal having transmitted this temporary electronic certificate, and if the authenticity of the temporary electronic certificate is incorrect or if the identifier of the terminal having transmitted this temporary electronic certificate does not correspond to the identifier contained in this temporary electronic certificate received, then the immediate execution of the processing requested by this terminal is systematically inhibited and, if not, the immediate execution of the processing requested is not systematically inhibited;

at the first connection, the temporary electronic certificate generated also comprises a date of validity computed from the computed scheduled date, this date of validity being subsequent to the scheduled date, and at the second connection, the method comprises a comparison of the current date with the date of validity of the temporary electronic certificate received and the systematic inhibition of the immediate execution of processing requested by this terminal if the current date is subsequent to the date of validity of the temporary electronic certificate and, if not, the immediate execution of the processing requested is not systematically inhibited.

One advantage of the foregoing embodiments is that selecting the scheduled date as a function of the common profile of use optimizes the workload of the server during off-peak periods.

Another advantage of the foregoing embodiments is that automatically selecting the scheduled date closest to the current date enables the fastest possible execution of all the processing operations without crossing the load threshold of the transaction server.

Yet another advantage of the foregoing embodiments is that authenticating the terminal during the first connection makes it more difficult to conduct a server attack that consists of making the server compute a large number of unnecessary scheduled dates since only one correctly authenticated terminal can activate this computation.

Still another advantage of the foregoing embodiments is that generating and using a temporary electronic certificate makes it more difficult to attempt any attack aimed at overloading the server by making it perform a large number of unnecessary processing operations since only the terminal having an authentic temporary electronic certificate can activate the execution of a processing operation by the server.

Another advantage of the foregoing embodiments is that the systematic non-execution of the processing operation when the received temporary electronic certificate has expired obliges the terminal to ask for a new scheduled date if that terminal was connected to the server after the date of validity of the temporary electronic certificate, thus achieving better smoothing of the workload of the transaction server.

An object of the invention is also a method of operation of a server for implementing the above smoothing method, in which the server: computes a scheduled date on which the terminal must set up a connection with the transaction server to transmit the request to it; builds a workload schedule of the transaction server according to the computed scheduled dates, this workload schedule associating, with each possible date, a forecast workload of this transaction server on this date; receives the individual profile of use of a terminal associating, with each possible coming date, a probability of state corresponding to the probability that the terminal is in the active state on this date; and computes the scheduled date by selecting a scheduled date associated, in the workload schedule of the transaction server, with a forecast workload below a predetermined first threshold and, at the same time, associated in the individual profile of use of this terminal with a probability of state corresponding to a probability, above a second predetermined threshold, that this terminal is in the active state.

An object of the invention is also a method of operation of a terminal for implementing the above smoothing method in which this terminal activates the setting up of a connection with the transaction server according to the computed scheduled date so that the setting up of this connection occurs only when or after this scheduled date has arrived, and the terminal: records instants of switching between: an active state of the terminal in which this terminal is capable of setting up the connection with the transaction server, and an inactive state of the terminal in which this terminal is incapable of setting up this connection with the transaction server, builds, for each terminal, on the basis of the recorded switching instants, an individual profile of use associating, with each possible coming date, a probability of state corresponding to the probability that the terminal is in the active state at this date; and transmits its built individual profile of use to a scheduled-date server and, in response, receives the computed scheduled date as a function of its individual profile of use.

An object of the invention is also an information-recording medium comprising instructions to execute any one of the above methods when an electronic computer executes these instructions.

Yet another object of the invention is also a terminal for implementing the above smoothing method, this terminal comprising: a network card to set up a connection with a transaction server, a programmable electronic computer capable of executing instructions recorded on an information-recording medium, and an information-recording medium comprising the instructions needed to execute the above smoothing method when these instructions are executed by the programmable electronic computer.

The embodiments of this terminal may comprise a descrambler capable of descrambling a scrambled multimedia content with a control word, and a security processor capable of decrypting a cryptogram of the control word contained in an ECM (Entitlement Control Message).

Yet another object of the invention is a server for implementing the above smoothing method. Such a server includes a programmable electronic computer capable of executing instructions recorded on an information-recording medium, and an information-recording medium containing instructions to execute the above smoothing method when the programmable electronic computer executes these instructions.

BRIEF DESCRIPTION OF THE DRAWINGS

The invention will be understood more clearly from the following description given purely by way of a non-exhaustive example and made with reference to the appended drawings, in which.

In these figures, the same references are used to designate the same elements.

DETAILED DESCRIPTION

Here below in this description, the characteristics and functions well known to those skilled in the art are not described in detail. Furthermore, the terminology used is that of systems of conditional access to scrambled multimedia contents. For more information on this terminology, the reader may refer to "Functional Model of a Conditional Access System", EBU Review, Technical European Broadcasting Union, Brussels, BE, N° 266, 21 Dec. 1995.

Figure 1:
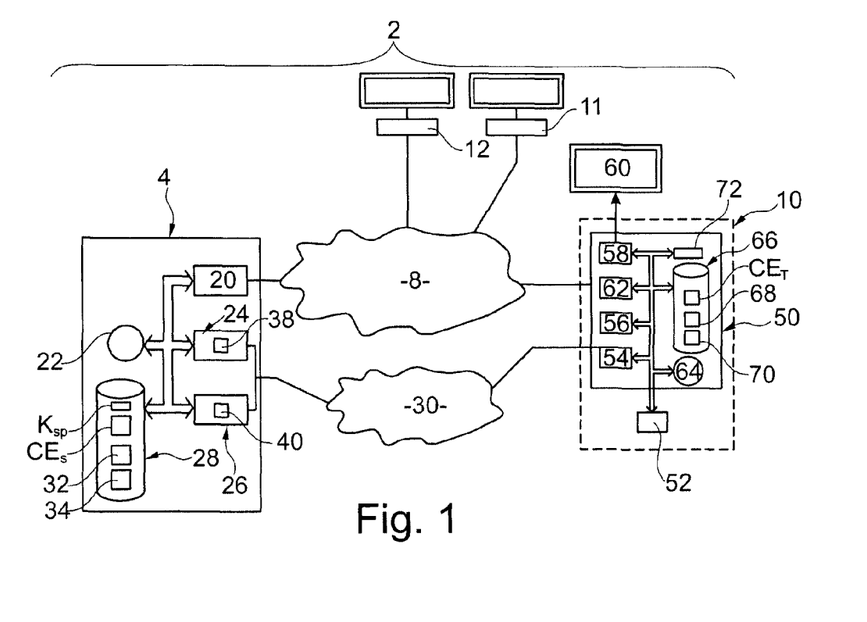
FIG. 1 is a schematic illustration of a system for sending and receiving scrambled multimedia contents.

FIG. 1 represents a system 2 for sending and receiving scrambled multimedia contents. The system 2 comprises a network head-end 4 broadcasting the scrambled multimedia contents intended for a multitude of terminals by means of an information transmission network 8. To simplify FIG. 1, only three terminals 10 to 12 are represented.

The network 8 is typically a long-distance information transmission network such as the Internet or a satellite network or any other broadcasting network such as the one used for the transmission of digital terrestrial television (DTT).

The network head-end 4 comprises a device 20 for broadcasting scrambled multimedia contents. For example, this device 20 is identical or similar to the device 6 described in the patent application FR 2954875 filed by Viaccess, but configured in a way that makes it unnecessary to implement the mechanisms to obtain the control words in advance. This device 20 shall therefore not be described in greater detail herein.

The head-end 4 also comprises: an internal clock 22 capable of giving the current date, a scheduled-date server 24, a transaction server 26, and a non-volatile memory 28.

The server 26 is capable of executing a processing operation in response to a request from one of the terminals of the system 2. Here, the server 26 is described in the particular case in which the processing operation requested by the terminal is the downloading of a software update for that terminal.

The server 24 is used to set up a scheduled date on which each terminal must be connected to the server 26 to download the software update corresponding to it.

The servers 24 and 26 are connected to each of the terminals by means of a two-way information transmission network 30. This network 30 is used to set up unicast connections between the server 24 or 26 and any unspecified terminal of the system 2. Here, to simplify FIG. 1, only the link between the network 30 and the terminal 10 is shown.

The memory 28 contains: a private key Ksp corresponding to a public key Kspu, an electronic certificate CEs, a workload schedule 32, and a common profile of use 34.

The plan 32 and the profile 34 are described in greater detail with reference respectively to FIGS. 8 and 9.

The electronic certificate CEs comprises a digital signature obtained for example by enciphering information contained in this certificate with the private key Ksp. The key Ksp is known by the network head-end 4 but is not known by the terminals of the system 2. This electronic certificate is verified by means of the public key Kspu. Here, the certificate contains especially an identifier of the transaction server 26.

The servers 24 and 26 are made with programmable electronic computers capable of executing instructions recorded on an information-recording medium. Here, the servers 24 and 26 comprise respective electronic computers 38 and 40 that are capable of executing instructions recorded in the memory 28. To this end, the memory 28 also comprises instructions for the execution of the method of FIG. 10.

In this embodiment, all the terminals are assumed to be identical. Thus, only the terminal 10 is described in greater detail.

The terminal 10 descrambles the multimedia contents transmitted by the network head-end 4 and displays them in plain (or unencrypted) form on the screen 60. The term "in plain form" designates the fact that the multimedia content thus displayed is directly perceptible and comprehensible to a human being.

The terminal 10 comprises a decoder 50 connected to a security processor 52. The decoder 50 demultiplexes and descrambles the multimedia contents received. The processor 52 decrypts the cryptograms of the control words contained in the ECMs (Entitlement Control Messages) that are transmitted to it by the decoder 50. The processor 52 is, for example, a smart card. Such a processor is described in the patent application FR 2954875. It is therefore not described in greater detail. In the illustrated embodiment, the processor 52 is a detachable processor capable of being removed from, and, alternately, introduced into the decoder 50 reversibly by the user.

The decoder 50 comprises: a network card 54 to set up the unicast connection with the servers 24 and 26 by means of the network 30, a descrambler 56 capable of descrambling the multimedia content received by means of the network 8 using the control word delivered by the processor 52, a graphic card 58 capable of displaying the descrambled multimedia content in plain form on the screen 60, a programmable electronic computer 62 capable of executing instructions on an information-recording medium, an internal clock 64 that delivers the current date, and a non-volatile memory 66.

Figure 10:
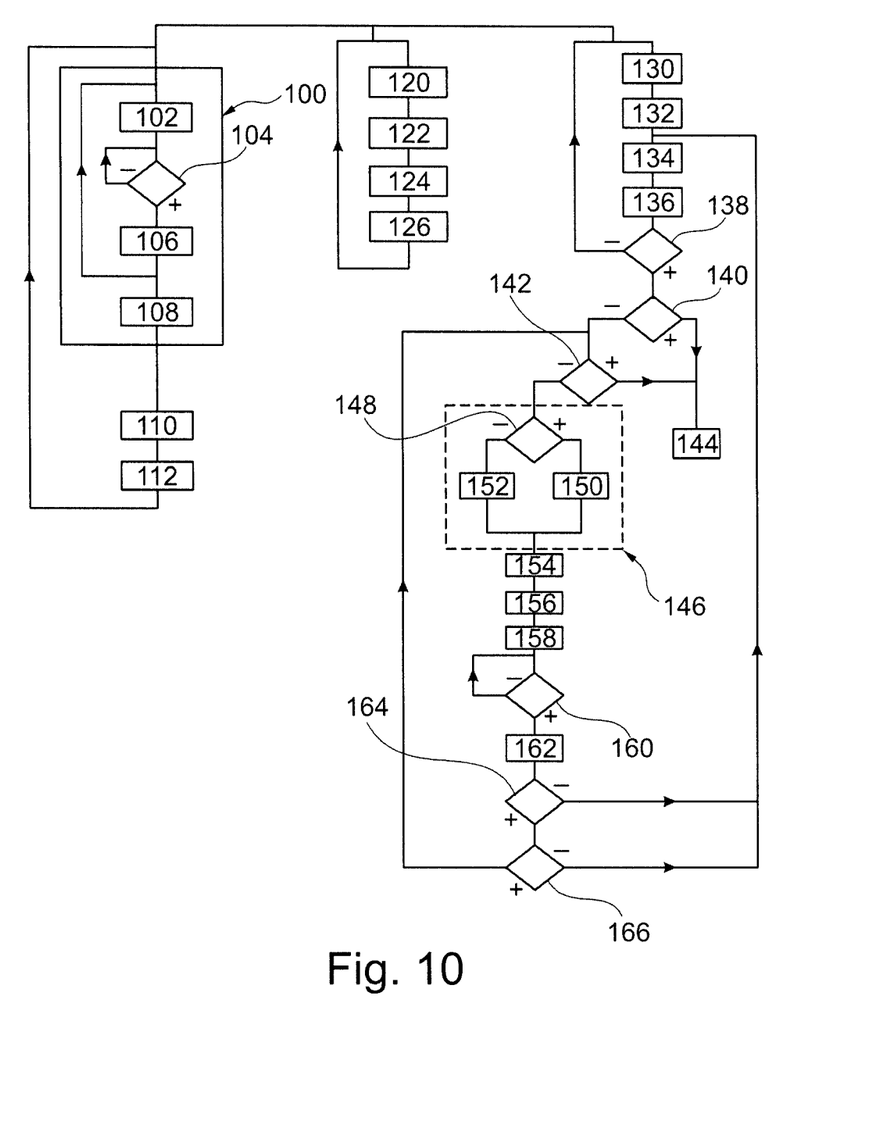
FIG. 10 is a flowchart of a method for smoothing the workload of a transaction server implemented in the system of FIG. 1.

The memory 66 contains the instructions executable by the computer 62 to implement the method of FIG. 10. Furthermore, this memory contains: an electronic certificate CET of the terminal, an individual profile of use 68, and a log 70 of switching instants.

Figure 2:
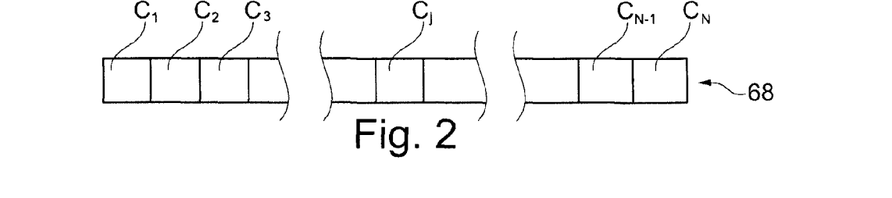
FIG. 2 is a schematic illustration of an individual profile of use.

The profile 68 and the log 70 are described in greater detail with reference to FIGS. 2 and 5.

The certificate CET comprises: an identifier of the terminal 10 used to identify this terminal from among the set of terminals of the system 2, and a digital signature.

The digital signature is obtained from the identifier of the terminal as well as from a private key KTp known to this terminal but unknown to the other terminals of the system.

The decoder 50 also comprises a man/machine interface 72 used to switch the terminal 10 between an active state and an inactive state. In the active state, the terminal 10 can automatically take the initiative to connect to the servers 24 and 26 to launch the execution of a processing operation by the server 26. In the inactive state, the terminal 10 is incapable of setting up a connection with the server 24 or 26. Typically, the active state corresponds to the powered-on state of the terminal, while the inactive state corresponds to the powered-off or standby or sleeping state of the terminal 10.

The interface 72 is, for example, a button or an infrared receiver associated with a remote control unit directly handled by the user.

An individual profile of use, such as the profile 68, is a function associating, with each date, a probability of state, or "state probability," $P_i$, where the index i is an identifier of the terminal. The probability of state $P_i$ corresponds to the probability that terminal i is in the active state on this coming date. Here, the probability of state $P_i$ takes a value between 0 and 1. The lower value of the probability $P_i$, the lower is the probability that the terminal is in the active state. Here, the profile 68 is implemented in the form of a table, an example of which is shown in FIG. 2. In this figure, and in the following figures, the undulating lines indicate that parts of the depiction have been omitted.

The profile 68 associates, with each coming time slot, a specific value of the probability $P_i$. Here, the time slots are immediately consecutive in time. The duration of a time slot typically ranges between one minute and twenty-four hours, and preferably between one minute and four hours, or between one minute and one hour. In this embodiment, the durations of each time slot are identical. Here, the duration of each time slot is equal to fifteen minutes.

Each time slot is associated with an identifier enabling identification of its position in time relative to the other time slots.

To this end, in this embodiment, the profile 68 has an ordered sequence of cells $C_j$ in which the position of the cell relatively to the other cells identifies the time slot concerned, where the index j is an identifier of the cell and therefore of the time slot. Each cell comprises a specific value $p_{ij}$ of the probability $P_i$ for this time slot.

The set of time slots defines a cycle of use of the terminal. Indeed, it is assumed here that the state of the terminal evolves cyclically, i.e. that the use of the terminal can be divided into successive cycles. During each cycle, the state of the terminal progresses in the course of time in a manner similar to the progress observed during the other cycles. For example, the duration of a cycle ranges from one hour to one year and typically from one day to one month. Here, the duration of a cycle is taken to be equal to one week.

The profile includes as many cells $C_j$ as there are successive time slots in a cycle.

Figure 3:
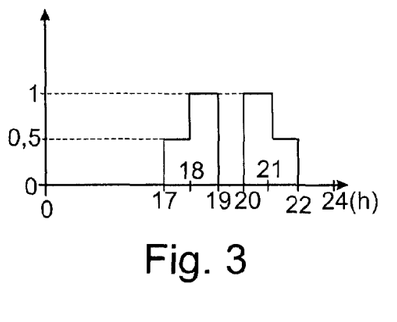
FIGS. 3 and 4 are timing diagrams representing respective examples of individual profile of use implemented in the system of FIG. 1.
Figure 4:
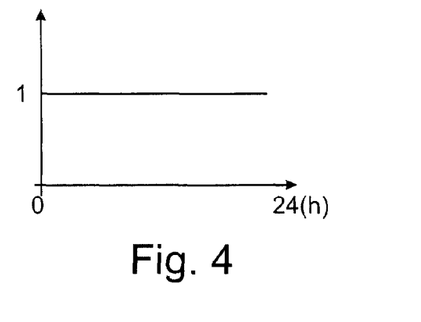

FIGS. 3 and 4 graphically and schematically represent the content of two different individual profiles. To simplify the illustrations, only one day, here below called "day 1," of the profiles is represented in FIGS. 3 and 4. Here, each of the profiles has been represented in the form of a timing diagram. The X axis therefore represents time expressed in hours and the Y axis represents the value of the probability $P_i$.

In the profile of FIG. 3, the probability that the terminal is in the active state between 1700 hours and 1800 hours and between 2100 hours and 2200 hours is 0.5 and the probability that it is active between 18 hours and 19 hours and between 2000 hours and 2100 hours is 1. Outside these time slots, the probability $P_i$ is zero. The profile of FIG. 3 corresponds to a user who turns his terminal off when he is no longer watching television.

In the profile of FIG. 4, the probability that the terminal is in the active state between 0000 and 2400 hours is constant and equal to 1. This corresponds to a user who never turns his terminal off, even when he is not watching television.

Figure 5:
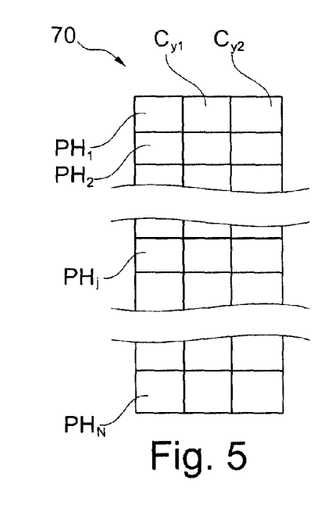
FIG. 5 is a schematic illustration of a log of instants of switching implemented in the system of FIG. 1.

FIG. 5 represents a more detailed view of an example of implementation of the log 70. The log 70 archives the instants of switching of the terminal between the active and inactive states, as observed over several cycles preceding the current date.

In the illustrated example, the log 70 is implemented in the form of a table having several columns and as many rows as there are time slots in a cycle. Each row corresponds to a time slot PHj. There are therefore N rows, where N is a whole number of time slots. Each column corresponds to a particular cycle of use of the terminal. A cell is present at the intersection of each row and each column. A cell has a "1" if the terminal has been in the active state from the start until at least the middle of the timeslot corresponding to the cell's corresponding row during the cycle identified by the cell's corresponding column. If not, the cell has a "0". To simplify the illustration, the table of FIG. 5 comprises only two columns Cy1 and Cy2 corresponding respectively to cycles "1" and "2." The column Cy1 corresponds to the current cycle and the column Cy2 corresponds to the cycle immediately preceding the cycle Cy1. The current cycle is the cycle containing the current date.

Figure 6:
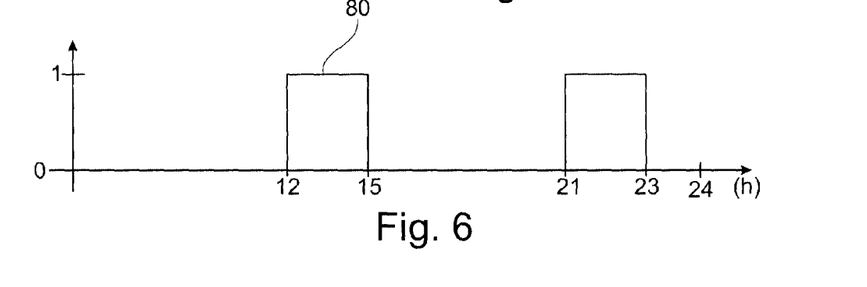
FIG. 6 is a timing diagram illustrating a part of the content of the log of FIG. 5.

An example of a log on a 24-hour cycle is illustrated by the graph of FIG. 6. In this graph, the X axis represents time and the Y axis represents the active state (value 1) and the inactive state (value 0). The curve 80 represents the progress in time of the log of the switching instants observed by the terminal.

Figure 7:
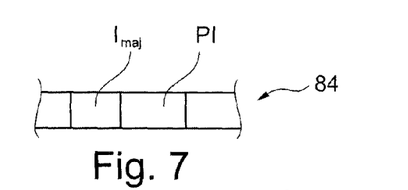
FIG. 7 is a schematic and partial illustration of a summons message implemented in the method of FIG. 1.

FIG. 7 is a schematic view of the structure of a summons message 84. This message 84 comprises: an identifier Imaj of the software update to be downloaded, and a definition of a time slot PI to set up a first connection.

The slot PI is a slot in which the different first connections of the terminals to the scheduled-date server 24 must be distributed in response to this summons message.

The summons message is typically disseminated by the device 6 to inform all the terminals that a software update is available and must be downloaded by these terminals.

The slot PI is, for example, defined by an end date, and, if necessary, a starting date. It extends over a fairly lengthy duration, i.e. a duration greater than ten minutes and preferably greater than one hour or three hours. This slot is big enough to enable several hundreds and preferably several thousand, tens of thousands or hundreds of thousands of terminals to become connected to the servers 24 or 26 during the duration of the slot.

Figure 8:
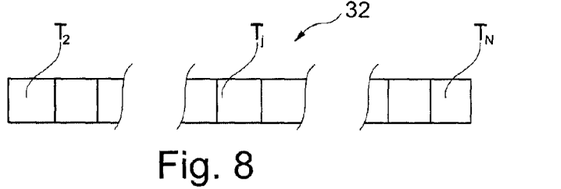
FIGS. 8 and 9 are schematic and partial illustrations of tables implemented in the method of FIG. 1.

FIG. 8 represents a particular implementation of the workload schedule 32. In this embodiment, the plan 32 is implemented in the form of a table that, with each date, associates a forecast workload of the transaction server 26. In the particular embodiment, with each time slot of a cycle, the table associates a cell Tj. This cell Tj comprises the expected number of simultaneous connections to the transaction server during this time slot. A maximum number Ncmax of simultaneous connections that can be borne by the server 26 is also known and memorized, for example, in the memory 28. In this embodiment, the expected rate of occupancy is equal to the expected number of simultaneous connections in relation to the number Ncmax. The number Ncmax is greater than 1,000 or 5,000 or 10,000.

Figure 9:
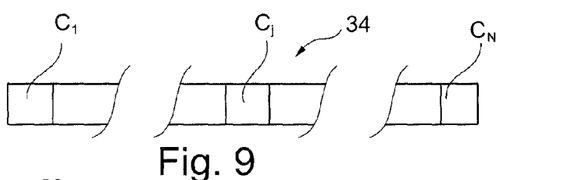

FIG. 9 represents a particular mode of implementation of the common profile of use 34. This profile 34 associates, with each date, a common probability of state Pc. The probability Pc corresponds to the probability that any unspecified terminal of the system 2 is in the active state on this coming date. The different values of the probability Pc therefore show the time slots during which there are greater chances that a very large number of terminals are in the inactive state. The time slot during which it is most probable that a very large number of terminals are in the inactive state is herein called an "off-peak time."

In this embodiment, the common profile 34 is implemented in a manner that is identical to what was described for the individual profile 68 except that, with each time slot, the cells Cj of the table associate a value of the probability Pc and not a value of the probability Pi.

The operation of the system 2 is described with reference to the method of FIG. 10.

Since the different terminals operate identically, the method described with reference to FIG. 10 relates only to the working of the terminal 10.

At a step 100, the terminal 10 records the instants at which it switches between the active and inactive states. It is assumed here that, at the start of a new cycle, the column Cy1 of the log 70 contains only "0s" in each cell.

When the terminal is in the active state, at step 102, it compares the current date given by its internal clock 64 with the dates corresponding to the start of the time slots PHj to identify the start of the next time slot.

Then, at step 104, the computer 62 compares the current date given by the clock 64 with a date corresponding to the middle of the next time slot identified during the operation 102. So long as the middle of this time slot is not exceeded by the current date, the computer 62 executes the operation 24 in a loop. When the current date is beyond the middle of the next time slot, step 106 is performed.

At step 106, the terminal writes a "1" in the cell corresponding to this time slot in the column Cy1.

Then, the steps 102 to 106 are repeated in a loop.

When the current date is beyond the end date of the last time slot of the column Cy1, the column Cy1 is shifted in an operation 108 to replace the column Cy2 and a new column Cy1 containing only "0s" is created.

Thus, the log 70 makes it possible to preserve a timeline of the switching instants recorded on a sliding window equal to two cycles.

Then, at a step 110 executed, for example, at each end of a cycle, the computer 62 builds the individual profile 68. To this end, the computer 62 computes the average of the contents of each row in the log 70. Thus, the individual profile 68 is built solely from the log of the switching instants of the particular terminal 10. Furthermore, the individual profile 68 is built by means of a sliding average, thus enabling it to adapt fairly swiftly to a change in the way in which the terminal is habitually used.

Figure 11:
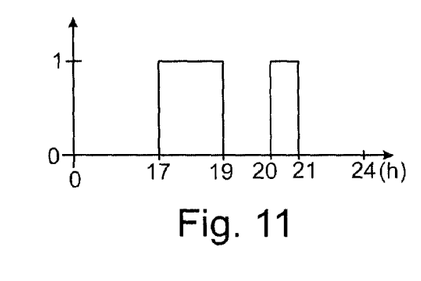
FIGS. 11 and 12 are schematic illustrations of readings of instants of switching used by the method of FIG. 10.
Figure 12:
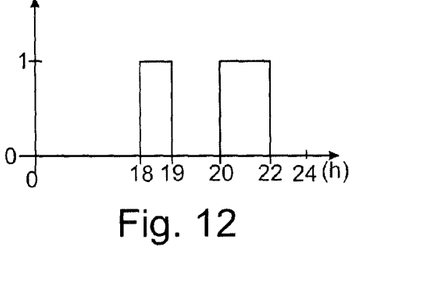

The timing diagrams of FIGS. 11, 12 and 3 illustrate computation of the value of the probability Pi. To simplify the illustrations, these graphs represent only one day in the cycle.

The timing diagrams of FIGS. 11 and 12 represent the logs of instants of switching of the terminal 10 for day 1 of the cycles 1 and 2. In these timing diagrams, the X and Y axes represent, respectively, the time expressed in hours and the state of the terminal similarly to what was described for the graph of FIG. 6. These timing diagrams show that the terminal 10 has been in the active state solely between 17 h 00 and 19 h 00 and 20 h 00 and 21 h 00 during day 1 of the cycle 1, and between 18 h 00 and 19 h 00 and 20 h 00 and 22 h 00 for day 1 of the cycle 2.

The average of the readings in the cycles 1 and 2 for day 1 between 17 h 00 and 18 h 00 is herein equal to 0.5. This value gives the value of the probability Pi between 17 h 00 and 18 h 00 during day 1. This procedure is performed for each time slot, giving the individual profile of use shown in FIG. 3.

Then, at a step 112, the built individual profile 68 is recorded in the memory 66 instead of the previous individual profile of use.

The steps 110 and 112 are repeated continuously as long as the terminal is in the active state, thereby continuously updating the individual profile 68.

In parallel, at a step 120, the device 20 permanently broadcasts the scrambled multimedia contents and ECMs and EMMs (Entitlement Management Messages) multiplexed together towards all the terminals by means of the network 8.

At step 122, each terminal in the active state receives the scrambled multimedia content and the ECM and EMM messages. During this step, the decoder 50 transmits the ECM and EMM messages to the security processor 52.

At step 124, the processor 52 decrypts the cryptogram of the control words contained in the ECM message and transmits the control word thus decrypted to the decoder 50.

In response, at a step 126, the descrambler 56 descrambles the scrambled multimedia content and transmits it to the video card 58 so that it is displayed in plain form on the screen 60.

The steps 120 to 126 are repeated in a loop.

In parallel with the preceding steps, at step 130, when an update of the software of the decoder 50 or of the processor 52 becomes necessary, the device 20 broadcasts the summons messages 84 through the network 8. The broadcast is a multicast broadcast. The channel used to broadcast this message 84 is, for example, the same as the one used to broadcast the EMMs. This message 84 is re-broadcast at regular intervals, so long as all the terminals have not been connected at least once to the scheduled-date server 24.

At a step 132, the terminal 10 listens permanently to this channel when it is in the active state. Thus, at step 132, the terminal 10 receives the message 84.

At step 134, in response to the message 84, the computer 62 determines a date of first connection. The date of first connection is determined so as to distribute the first connections of the terminals to the server as uniformly as possible in time. For example, the computer 62 randomly or pseudo-randomly draws a first connection date contained in the slot PI contained in the messages 84.

Then, at step 136, the terminal 10 activates the setting up of this first connection to the server 24 as a function of the determined first connection date. To this end, the computer 62 watches to see whether the first connection date has arrived or has been crossed. To this end, for example, it compares, at regular intervals, the current date delivered by the internal clock 64 with the first connection date. So long as the current date remains prior to the date of first connection, the computer 64 inhibits the activation of the setting up of this first connection. Conversely, as soon as the current date is equal to or subsequent to the first connection date, the computer 62 activates the setting up of this first connection. This first connection is a unicast connection set up between the terminal 10 and the server 24 by means of the network 30.

At this first connection, as during the following connections, the terminal 10 sends the server 24 an update request. The update request contains: a priority code indicating whether the processing operation must be executed immediately or whether it can be postponed, the terminal's individual profile of use 68, and the terminal's electronic certificate CET.

At step 138, the server 24 verifies the authenticity of the terminal 10 from the received certificate CET. If the authentication is incorrect, i.e. if the identity of the received terminal does not correspond to the identifier used to build the digital signature contained in the electronic certificate CET, then the method returns to step 130.

If not, the method continues with a step 140, during which the server 24 checks to see whether the received update request contains a priority index indicating that the processing operation must be executed immediately. If it does, the server 24 then activates the server 26 to activate the immediate execution of the requested processing operation.

If there is no such priority index, at step 142 the server 24 measures the current workload of the server 26. Here, the server 24 counts out the current number CA of simultaneous connections to the server 26. If the number CA is smaller than a predetermined threshold Sdelayed, it immediately proceeds to a step 144, during which the processing requested by the terminal is immediately executed by the server 26.

At step 142, the server 24 builds and updates the common profile 34 from the profile 68 received at step 136. For example, to achieve this end, the server 24 computes the average of the X last individual profiles of use received to obtain an average profile of use, where X is an integer greater than 10, 100 or 1,000. This average profile of use then constitutes the new common profile 34.

At step 144, the terminal 10 downloads the software update that corresponds to the identifier Imaj from the server 26.

If the measured urrent load CA exceeds the threshold Sdelayed, then step 146 is performed for computing a scheduled date between this terminal 10 and the transaction server 26.

To this end, during an operation 148, the server 24 starts by detecting whether the terminal 10 is permanently in the active state. To this end, for example, it computes the difference δ between the greatest and smallest value of the probability Pi contained in that terminal's individual profile 68. Then, it compares this difference δ with a predetermined threshold ε. In one example, the threshold ε is below 0.2*Max(Pi) and preferably below 0.1*Max(Pi) or 0.05*Max(Pi), where Max(Pi) is the greatest value of the probability Pi.

If the difference δ is below the threshold ε, then the terminal 10 is considered to be permanently in the active state. In this case, an operation 150 is carried out for selecting the scheduled date in taking account, in addition to the workload schedule 32 and the individual profile 68, of the common profile of use 34.

If not, the terminal 10 is considered as not being systematically in the active state. A step 152 is then carried out for selecting the scheduled date as a function of the workload schedule 32 and the individual profile 68 without using the common profile 34.

At the operation 150, the server 24 selects the scheduled date associated in the common profile 34 with a value of the probability Pc below a predetermined threshold S0. In the particular embodiment described herein, the threshold S0 is determined dynamically. For example, it is chosen to be equal to the smallest value of the probability Pc for which the forecast load of the server 26 is below a predetermined threshold S1. In one particular example, the threshold S1 is chosen to be equal to Ncmax.

For example, to this end, the server 24 marks all the time slots of the workload schedule 32 for which the forecast load is above or equal to the threshold S1 as being "unavailable". Then, the server 24 selects a scheduled date in a time slot that is both:available, i.e. it has not been marked as being "unavailable" in the workload schedule, and that corresponds to the smallest value of the probability Pc associated with available time slots.

Step 150 makes it possible to optimize the workload of the server 26 during the off-peak hours. Indeed, the software updates of the terminals permanently in the active state are thus preferably made during these off-peak hours.

At step 152, the server 24 selects a scheduled date associated, in the workload schedule 32, with a forecast load below a predetermined threshold such as the threshold S1, and, at the same time, associated in the individual profile 68, with a value of the probability Pi above a predetermined threshold S2.

Furthermore, from among the different dates fulfilling the above two conditions, the server 24 automatically and systematically selects the date that is closest to the present current date.

After having built the scheduled date at step 154, the server 24 generates a temporary electronic certificate containing an identifier of the terminal, the scheduled date built, and a date of validity of this certificate. This temporary electronic certificate also comprises a digital signature obtained, for example by encrypting the identifier of the terminal, the scheduled date, and the date of validity with the private key Ksp of the network head-end 4.

The identifier of the terminal is, for example, its address on the network 30, such as its IP (Internet Protocol) address, or the same identifier as the one contained in the electronic certificate CET.

The date of validity is defined according to the scheduled date built. For example, the date of validity is equal to the scheduled date built to which a predetermined duration δT is added. Embodiments include those in which the duration δT is less than sixty seconds, less than five minutes, and less than fifteen minutes.

At step 156, the server 24 sends the terminal 10 the temporary electronic certificate by means of the first unicast connection.

Then, at step 158, the server 24 or 26 builds and updates the workload schedule 32 according to the new scheduled date built. To this end, for example, the server 24 adds one unit to the planned number of connections contained in the cell Tj corresponding to this scheduled date.

The duration of execution of the steps 146 to 158 is strictly smaller than and preferably at least ten or 100 times smaller than the duration of execution of the processing during the step 144. Thus, at the same time, the server 24 is capable of computing more scheduled dates than the processing operations executed by the server 26.

At step 160, the terminal 10 is disconnected from the servers 24 and 26. Then, at this step, it permanently monitors the arrival of the scheduled date. For example, it regularly compares the current date coming from the clock 64 with the scheduled date. If the current date is prior to the scheduled date, the method remains at the step 160. Thus, so long as the current date is prior to the scheduled date, the computer 62 inhibits the activation of the setting up of the connection to the server 26.

When the current date is equal to or subsequent to the computed scheduled date, the terminal executes step 162. At step 162, the terminal 10 activates the setting up of the unicast connection with the transaction server 26 and, by means of this connection, transmits the update request as well as the temporary electronic certificate received at step 156.

At a step 164, the server 26 compares the date of validity of the temporary certificate transmitted with the current date delivered by its internal clock 22.

If the current date is subsequent to the date of validity or prior to the scheduled date, then the method returns, for example, to step 134. To this end, the connection between the server 26 and the terminal 10 is interrupted and the terminal 10 sets up a new connection with the server 24. At this subsequent execution of step 134, the new date of the first connection determined can be outside the slot PI.

If the current date is between the scheduled date and the validity date, then step 166 is performed. During step 166, the server 26 verifies the authenticity of the temporary certificate from the digital signature and the public key Kspu. Also during this step, the server 26 ascertains that an identifier of the terminal, such as its IP (Internet Protocol) address or the address contained in the certificate CET, corresponds to that contained in the temporary certificate. If the authenticity of the temporary electronic certificate is not correct, or if the correspondence between the compared identifiers of the terminal is not established, then the method returns, for example, to step as described above. If not, the method returns to step 142.

Normally, if the forecasts of the workload schedule 32 are correct, at this second execution of step 142, it is determined that the workload of the server 26 is small enough for the requested processing to be capable of being executed by this server.

Many other embodiments are possible. For example, the summons message is broadcast until a number of terminals corresponding to a predetermined threshold have received this summons message and have been connected at least once to the scheduled-date server 24. When this predetermined threshold is reached, the broadcasting of the summons message stops. Then, the server 24 dictates an updating of the remaining terminals. For example, by means of a unicast link, it transmits, to each remaining terminal, a message notifying that it must carry out the update under penalty of having its subscription revoked.

The threshold Sdelayed can be chosen to be equal to zero so that no immediate processing of the requests is possible. In this variant, the first connection is used solely to obtain a scheduled date.

The threshold Sdelayed can also be adjusted dynamically. For example, if the scheduled-date server ascertains by measurement that the number of connections set up simultaneously to execute a priority processing operation is beyond a threshold Smaxp, then the threshold Sdelayed is reduced by a determined value in order to reserve greater processing capacity for the priority processing operations.

Different hardware architectures can implement the functions of the servers 24 and 26. For example, in one variant, the servers 24 and 26 are replaced by one and the same server using the same electronic computer to fulfill the functions of the servers 24 and 26.

The scheduled-date server can furthermore be implemented somewhere other than in the network head-end. For example, the scheduled-date server can be implemented in a server independent of this network head-end and connected to this network by a long-distance information-transmission network.

Functions of the scheduled-date server can also be implemented in each terminal. For example, in this case, the network head-end 4 or the transaction server 26 transmits its workload schedule to the terminals so that it can select the scheduled date as a function of both this workload schedule and its individual profile of use. Typically, the computing of the scheduled date is identical to that described with reference to the method of FIG. 10. Then, the terminal transmits the scheduled date thus computed to the transaction server so that the workload schedule can be updated as a function of this new scheduled date.

Either server 24 or 26 can update the workload schedule.

The predetermined threshold S2, with which the probability of state Pi is compared to select the scheduled date, can be determined as a function of the same individual profile of use. For example, the threshold S2 is taken to be equal to the maximum of the probability Pi in the profile 68.

The profile of use can be made in different ways. For example, the profiles of use may contain the probability that one terminal or all the terminals are in the inactive state instead of the probability that they are in the active state. In this case, the probability that the terminal is in the active state can be computed from the probability that this terminal is in the inactive state. Thus, the method described here above can easily be adapted to this situation.

The profile of use can also be built solely from the switching instants recorded on one cycle only. Preferably, the cycle is the last cycle performed. In this case, for example, the probability that the terminal is in the active state in a time slot is taken to be equal to "1" if the terminal had been in the active state in this same time slot during the last cycle. If not, the probability is taken to be equal to "0". Thus, in this variant, the probability of state is not computed on the basis of an average of instants of switching recorded over several cycles.

Conversely, the profiles of use can also be built from switching instants recorded on more than two cycles.

The durations of the time slots are not necessarily all identical.

The profile of use may comprise several different periods, themselves sub-divided into time slots. In one example, a first 24-hour period corresponds to the days of the week and a second 24-hour period corresponds to the days of the weekend. It is assumed in this case that the user's behavior during weekdays has a one-day cyclic nature just as it does during the days of the week.

There are also other ways of making this workload schedule. For example, in another embodiment, the workload schedule associates, with each possible scheduled date, a non-occupancy rate of the server instead of the forecast load of the server. The forecast load of the server can be deduced from the expected non-occupancy rate. Thus, the working of this embodiment is deduced from the working of the method of FIG. 10.

The threshold δ indicating whether the terminal is permanently in the active state can also be computed by the terminal and transmitted to the server in its update request.

The scheduled-date server can generate scheduled dates for several transaction servers. In this case, the scheduled-date server selects the workload schedule of the transaction server capable of performing the requested operation from among the different workload schedules of each of the possible transaction servers. Only the selected workload schedule is used to compute the scheduled date.

As a variant, the authentication of the terminal and of the server as well as the generation of the temporary electronic certificate and its use are omitted.

In another variant, the inactive state does not correspond only to the powered-off state or to a sleeping state of the terminal. For example, the terminal is considered to be in the inactive state when it is busy executing a priority task. A task is defined as being a priority task if its execution is slowed down by the connection, at the same time, to the transaction server, and if the user can perceive this slowing down of the execution of the priority task.

For example, a priority task is the navigation of the user in a menu of the terminal. A priority task may also be the descrambling of the multimedia content and its display in plain form when the user is watching this content. A user is considered to be in the course of watching a multimedia content if, within the last least X hours, he has acted on the terminal through a local man/machine interface of the terminal. Typically X is smaller than three or two hours. For example, if less than X hours ago, the user changed channels, raised the sound or navigated in an interactive menu of the terminal, then the terminal is considered to be in the inactive state to give priority to the processing of the actions requested by the user.

The invention claimed is:

1. A method for smoothing a workload of a transaction server that is executing processing operations in response to requests that have been transmitted by terminals that are remote and distinct from one another, said method comprising after or during a first connection between a terminal and said transaction server, computing a scheduled date on which said terminal must set up a second connection with said transaction server to transmit said request to said transaction server, activating setting up of said second connection by said terminal as a function of said computed scheduled date so that setting up of said second connection takes place only on or after arrival of said scheduled date, building a workload schedule for said transaction server according to scheduled dates that have been computed, wherein said workload schedule associates, with each possible date, a forecast workload of said transaction server on said date, for each terminal, recording instants of switching between an active state of said terminal and an inactive state of said terminal, wherein during an active state of a terminal, said terminal is capable of setting up said second connection with said transaction server, and wherein during an inactive state of said terminal said terminal is incapable of setting up said second connection with said transaction server, building, for each terminal, based on said recorded switching instants, an individual profile of use, wherein said individual profile of use associates, with each possible coming date, a state probability corresponding to a probability that said terminal is in said active state on said date, and wherein computing said scheduled date comprises selecting, as a function of said workload schedule and of said individual profile, a scheduled date that is associated, in said workload schedule of said transaction server, with a forecast workload below a first predetermined threshold, and that is concurrently associated, in said individual profile of use of said terminal, with a state probability corresponding to a probability, above a second predetermined threshold, that said terminal is in said active state.

2. The method of claim 1, further comprising building a common profile of use from said switching instants recorded for all said terminals, wherein said common profile of use associates, with each possible coming date, a common state probability corresponding to a probability that any unspecified terminal among said different terminals is in an active state, wherein, if said individual profile of a terminal associates, with each coming date, an individual state probability corresponding to a probability, above said second predetermined threshold, that said terminal is in said active state, then computing said scheduled date comprises selecting a scheduled date that is concurrently associated, in said workload schedule of said transaction server, with a forecast workload below a first predetermined threshold, in said individual profile of use of said terminal, with a probability of state corresponding to a probability, above a second predetermined threshold, that said terminal is in said active state, and in said common profile of use, with a probability of state corresponding to a probability, below a third predetermined threshold, that any unspecified terminal among said different terminals is in said active state.

3. The method of claim 1, wherein computing a scheduled date comprises automatically selecting a scheduled date closest to said current date.

4. The method of claim 1, wherein before computing said scheduled date, said terminal activates said setting up of a first connection with a scheduled-date server to obtain said scheduled date computed from an individual profile of use for said terminal, and wherein said terminal interrupts said first connection before said computed scheduled date.

5. The method of claim 4, wherein, at said first connection, said terminal transmits, to said scheduled-date server, an electronic certificate containing an identifier of said terminal and a digital signature of said terminal identifier with a private key known to said terminal alone, wherein said scheduled-date server verifies authenticity of said identifier of said terminal from said electronic certificate received, wherein, if said terminal is correctly authenticated, a scheduled date is computed and transmitted to said terminal, and wherein, if said terminal is not correctly authenticated, no scheduled date is computed for said terminal.

6. The method of claim 5, further comprising, only if said terminal is correctly authenticated, at said first connection, generating a temporary electronic certificate comprising at least said computed scheduled date, an identifier of said terminal to which said computed scheduled date has been allotted, and a digital signature of said computed scheduled date and of said identifier of said terminal with a private key proper to said transaction server, and transmitting said temporary electronic certificate to said terminal, and at said second connection, transmitting, by said terminal, said temporary electronic certificate received at said scheduled-date server or said transaction server, and verifying authenticity of said temporary electronic certificate and of said correspondence between said identifier of said terminal contained in said temporary electronic certificate and an identifier of said terminal having transmitted said temporary electronic certificate, and if authenticity at least one of said temporary electronic certificate is incorrect and said identifier of said terminal having transmitted said temporary electronic certificate fails to correspond to said identifier contained in said received temporary electronic certificate, systematically inhibiting immediate execution of said processing requested by said terminal, otherwise, if said authenticity of said temporary electronic certificate is correct, not systematically inhibiting immediate execution of said processing requested by said terminal.

7. The method of claim 6, wherein at said first connection, said temporary electronic certificate generated further comprises a date of validity computed from said computed scheduled date, said date of validity being subsequent to said scheduled date, and at said second connection, said method comprises comparing said current date with said date of validity of said temporary electronic certificate received, and systematically inhibiting immediate execution of processing requested by said terminal if said current date is subsequent to said date of validity of said temporary electronic certificate and, if not, not systematically inhibiting immediate execution of said processing requested by said terminal.

8. A method of operating a server to implement the method of claim 1, said method comprising causing said server to compute a scheduled date at which said terminal must set up a second connection with said transaction server to transmit said request to said transaction server, causing said server to build a workload schedule of said transaction server according to said computed scheduled dates, wherein said workload schedule associates, with each possible date, a forecast workload of said transaction server on said date, allowing said server to receive said individual profile of use of a terminal, wherein said individual profile of use associates, with each possible coming date, a state probability corresponding to a probability that said terminal is in said active state on said date, causing said server to compute said scheduled date by selecting a scheduled date that is associated with, in said workload schedule of said transaction server, a forecast workload below a predetermined first threshold and, that is associated within an individual profile of use of said terminal, a state probability that corresponds to a probability, above a second predetermined threshold, that said terminal is in said active state.

9. A method of operating a terminal for implementing the method of claim 1, wherein said terminal activates said setting up of a second connection with said transaction server according to said computed scheduled date so that said setting up of said second connection occurs only when or after said scheduled date has arrived, said method comprising: causing said terminal to record instants of switching between an active state and an inactive state, wherein, in said active state, said terminal is capable of setting up said second connection with said transaction server, and wherein, in said inactive state, said terminal is incapable of setting up said second connection with said transaction server, causing said terminal to build, based on said recorded switching instants, an individual profile of use that associates, with each possible coming date, a state probability corresponding to a probability that said terminal is in said active state on said date, transmitting said built individual profile of use to a scheduled-date server and, in response, receiving said computed scheduled date as a function of said individual profile of use.

10. A non-transitory computer-readable medium having instructions thereon that, when executed by a computer system, cause said computer system to execute the method of claim 1.

11. An apparatus comprising a terminal, said terminal comprising a network card to set up a connection with a transaction server, and a computer-readable medium as recited in claim 10.

12. The apparatus of claim 11, wherein said terminal further comprises a descrambler configured for descrambling scrambled multimedia content with a control word, and a security processor configured for decrypting a cryptogram of said control word contained in an entitlement control message.

13. An apparatus comprising a server, wherein said server comprises a programmable electronic computer, and an information-recording medium having encoded thereon instructions for execution by said server, said instructions comprising instructions for implementing the method of claim 1.

* * * * *